US010323557B2

United States Patent
Kubota et al.

(10) Patent No.: US 10,323,557 B2
(45) Date of Patent: Jun. 18, 2019

(54) CONSTRUCTION MACHINE

(71) Applicant: Hitachi Construction Machinery Co., Ltd., Taito-ku, Tokyo (JP)

(72) Inventors: Hayato Kubota, Tsuchiura (JP); Kazuhiko Mizoguchi, Ishioka (JP); Hiroki Sugawara, Kasumigaura (JP); Shigeru Hirasawa, Mito (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/757,235

(22) PCT Filed: Sep. 7, 2016

(86) PCT No.: PCT/JP2016/076312
§ 371 (c)(1),
(2) Date: Mar. 2, 2018

(87) PCT Pub. No.: WO2017/061223
PCT Pub. Date: Apr. 13, 2017

(65) Prior Publication Data
US 2018/0274423 A1    Sep. 27, 2018

(30) Foreign Application Priority Data
Oct. 6, 2015  (JP) .................................. 2015-198415

(51) Int. Cl.
*B60K 13/04*    (2006.01)
*F01N 3/20*    (2006.01)
(Continued)

(52) U.S. Cl.
CPC ............ *F01N 3/2066* (2013.01); *B60K 11/02* (2013.01); *B60K 13/04* (2013.01); *E02F 9/00* (2013.01);
(Continued)

(58) Field of Classification Search
CPC ........ B60K 13/04; B60K 15/063; Y02T 10/24
See application file for complete search history.

(56) References Cited

U.S. PATENT DOCUMENTS

| 2014/0196975 | A1 | 7/2014 | Hata et al. | |
| 2014/0326527 | A1 | 11/2014 | Harada et al. | |
| 2016/0160726 | A1* | 6/2016 | Imano | B60K 11/06 60/276 |

FOREIGN PATENT DOCUMENTS

| EP | 2 226 478 A1 | 9/2010 |
| JP | 2009-138526 A | 6/2009 |

(Continued)

OTHER PUBLICATIONS

International Search Report (PCT/ISA/210) issued in PCT Application No. PCT/JP2016/076312 dated Dec. 6, 2016 with English translation (Four (4) pages).

(Continued)

Primary Examiner — Bryan A Evans
(74) Attorney, Agent, or Firm — Crowell & Moring LLP

(57) ABSTRACT

On a revolving frame (5), a counterweight (6), an engine (7), a cooling fan (9), a heat exchanger (10), an exterior cover (14) forming a machine room (15) on the revolving frame (5), an exhaust gas purifying device (16) including a urea selective reduction catalyst (24), a urea water injection valve (26) injecting a urea water which is a reducing agent toward an upstream side of the urea selective reduction catalyst (24), and a urea water supply line (28) through which the urea water to be supplied to the urea water injection valve (26) flows are provided. A horizontal support member (34) supporting the exterior cover (14) is provided on a front side of the counterweight (6), and a heat shield cover (38) is mounted on the horizontal support member (34). A line accommodating space (41) is formed between the horizontal support member (34) and the heat shield cover (38), and a (Continued)

urea water supply line (28) for shielding heat from the engine (7) is accommodated in this line accommodating space (41).

4 Claims, 11 Drawing Sheets

(51) Int. Cl.
*E02F 9/00* (2006.01)
*E02F 9/18* (2006.01)
*F01N 3/08* (2006.01)
*B60K 11/02* (2006.01)
*E02F 9/08* (2006.01)
*F01P 1/06* (2006.01)
*F01P 5/04* (2006.01)
*E02F 3/32* (2006.01)
*F01P 1/00* (2006.01)

(52) U.S. Cl.
CPC .......... *E02F 9/0866* (2013.01); *E02F 9/0883* (2013.01); *E02F 9/0891* (2013.01); *E02F 9/18* (2013.01); *F01N 3/08* (2013.01); *F01P 1/06* (2013.01); *F01P 5/04* (2013.01); *E02F 3/32* (2013.01); *F01N 2610/02* (2013.01); *F01N 2610/1406* (2013.01); *F01P 2001/005* (2013.01); *Y02A 50/2325* (2018.01)

(56) References Cited

FOREIGN PATENT DOCUMENTS

| JP | 2009138526 A | * | 6/2009 | ............ E02F 9/0866 |
|---|---|---|---|---|
| JP | 2010-261373 A | | 11/2010 | |
| JP | 2012-145086 A | | 8/2012 | |
| JP | 2014-80907 A | | 5/2014 | |
| JP | 2015-1159 A | | 1/2015 | |
| WO | WO 2013/128689 A1 | | 9/2013 | |

OTHER PUBLICATIONS

Japanese-language Written Opinion (PCT/ISA/237) issued in PCT Application No. PCT/JP2016/076312 dated Dec. 6, 2016 (Five (5) pages).

Extended European Search Report issued in counterpart European Application No. 16853377.6 dated Apr. 1, 2019 (seven (7) pages).

* cited by examiner

CONSTRUCTION MACHINE

TECHNICAL FIELD

The present invention relates to a construction machine such as a hydraulic excavator including an exhaust gas purifying device for purifying nitrogen oxides in an exhaust gas, for example.

BACKGROUND ART

In general, a hydraulic excavator as a construction machine is constituted by a self-propelled lower traveling structure, an upper revolving structure mounted on the lower traveling structure, capable of revolving around a center of a revolving device as a revolving center, and a working mechanism provided on the upper revolving structure, capable of moving upward/downward.

The upper revolving structure is constituted by including a revolving frame forming a support structural body, a counterweight provided on a rear side of the revolving frame and taking a weight balance with the working mechanism, an engine located on a front side of the counterweight and mounted on a rear side of the revolving frame in a horizontal position extending in a left-and-right direction, a cooling fan rotating with the engine as a power source and suctioning an outside air as cooling air, a heat exchanger arranged closer to an upstream side in a flow direction of the cooling air than the cooling fan, and an exterior cover forming a machine chamber accommodating onboard devices such as the engine, the heat exchanger and the like on the revolving frame.

For the engine of the hydraulic excavator, a diesel engine is used, and this diesel engine discharges nitrogen oxides (hereinafter referred to as NOx) together with the exhaust gas. Thus, an exhaust gas purifying device for purifying NOx contained in the exhaust gas is known. This exhaust gas purifying device is provided in an exhaust pipe of the engine, for example, constituted by a urea selective reduction catalyst for removing nitrogen oxide in the exhaust gas and a urea water injection valve for injecting a urea solution as a reducing agent to the urea selective reduction catalyst and decomposes NOx into a harmless nitrogen gas and water. Thus, a urea water tank for storing the urea water which is a reducing agent and a urea water supply line for supplying the urea water to the urea water injection valve are provided in the hydraulic excavator.

Here, if the urea water (32.5% urea water, for example) used for purifying NOx is held at a high temperature of approximately 60° C., its quality deteriorates in approximately one week and cannot be used anymore, and the higher the temperature becomes, the faster the quality deteriorates. Since the deteriorated urea water has high corrosiveness, there is nonconformity that it corrodes metal components such as the urea water injection valve. Thus, the urea water tank storing the urea water and the urea water supply line through which the urea water flows needs to be arranged at a place where it is hardly susceptible to heat from the engine and a temperature is held low in the machine room.

On the other hand, an art of cooling the urea water in the urea water tank by the cooling air with a low temperature before passing through the heat exchanger by arranging the urea water tank on an upstream side from the heat exchanger in the flow direction of the cooling air is disclosed (Patent Document 1).

Moreover, an art in which a box-shaped or frame-shaped fixing member is fixed to the upper revolving structure, and the urea water tank is arranged inside this fixing member through a heat insulating material is disclosed. As a result, even if the temperature in the machine room is raised by the heat generated by the engine or the like, a temperature rise of the urea water stored in the urea water tank can be suppressed (Patent Document 2).

On the other hand, by laying out the urea water supply line at a position separated from the onboard device which becomes a heat source such as an engine, a hydraulic pump or the like or by covering the urea water supply line with the heat insulating material, a rise of the temperature of the urea water flowing through the urea water supply line can be suppressed.

PRIOR ART DOCUMENT

Patent Document

Patent Document 1: Japanese Patent Laid-Open No. 2009-138526 A
Patent Document 2: Japanese Patent Laid-Open No. 2012-145086 A

SUMMARY OF THE INVENTION

However, the urea water injection valve is arranged in the vicinity of the engine in order to inject the urea water into the exhaust gas. Therefore, a part of the urea water supply line connecting the urea water tank and a fuel injection valve to each other is laid out in an engine room in which the engine is arranged in the machine room.

In this case, an injection amount of the urea water is substantially in proportion to a fuel consumption amount. Thus, in the hydraulic excavator having a small engine output and a smaller fuel consumption amount, the flow of the urea water flowing through the urea water supply line is slow, and time during which the urea water stays in the urea water supply line becomes long. Moreover, if the urea water supply line laid out in the engine room becomes long due to the layout of the onboard devices arranged in the engine room, the temperature of the urea water rises while the urea water flows through the lengthy urea water supply line.

Thus, in the hydraulic excavator particularly with a small engine output or the hydraulic excavator with the length of the urea water supply line laid out in the engine room being long, even if the heat insulating material is wound around the urea water supply line, the heat from the engine or the like cannot be sufficiently shut off, and there is a problem that the temperature of the urea water rises. Moreover, if a device accommodating space in the engine room is small, the heat insulating material having a sufficient thickness cannot be wound around the urea water supply line, and there is a problem that the temperature of the urea water rises.

The present invention was made in view of the aforementioned problems of the prior arts and has an object to provide a construction machine which can suppress a temperature rise of a urea water by shielding a urea water supply line from the heat of an engine.

(1) In order to solve the aforementioned problems, the present invention is applied to a construction machine comprising: a self-propelled lower traveling structure and an upper revolving structure mounted rotatably on the lower traveling structure, the upper revolving structure comprising: a revolving frame forming a support structural body; a counterweight provided on a rear side of the revolving frame; an engine located on a front side of the counterweight and provided on the revolving frame in a horizontal position, extending in a left-and-right direction; a cooling fan provided on one side in a left-and-right direction of the engine and suctioning an outside air as a cooling air by rotating with the engine as a power source; a heat exchanger located closer to an upstream side in a flow direction of the cooling air than the cooling fan and provided by facing the cooling fan and cooling a fluid by the cooling air; an exterior cover formed by including a left surface plate, a right surface plate, and a top surface plate and forming a machine room for accommodating onboard devices including the engine and the heat exchanger on the revolving frame; an exhaust gas purifying device provided in an exhaust pipe of the engine and including a urea selective reduction catalyst for removing nitrogen oxides in an exhaust gas; a urea water injection valve provided in the exhaust gas purifying device and injecting a urea water which is a reducing agent to an upstream side of the urea selective reduction catalyst; a urea water tank storing the urea water to be supplied to the urea water injection valve; and a urea water supply line connecting the urea water tank and the urea water injection valve through the machine room and through which the urea water to be supplied to the urea water injection valve flows.

A feature of the present invention is that the construction machine further comprising: a support member arranged on a front side of the counterweight and supporting the exterior cover; and a heat shield cover provided on the support member for shielding heat from the engine and forming a line accommodating space for accommodating the urea water supply line between itself and the support member.

According to the present invention, by mounting a heat-shielding cover using the support member for supporting the exterior cover, the line accommodating space can be formed between the support member and the heat-shielding cover. As a result, a portion in the urea water supply line passing through the machine room and influenced by the heat from the engine can be shielded from a hot air by a support portion seat and the heat-shielding cover. Therefore, the temperature rise of the urea water flowing through the urea water supply line by the heat from the engine can be suppressed. As a result, deterioration of the urea water caused by the heat can be prevented, and reliability of the exhaust gas purifying device including the urea selective reduction catalyst can be improved.

MODE FOR CARRYING OUT THE INVENTION

Hereinafter, an embodiment of a construction machine according to the present invention will be described in detail in accordance with the attached drawings by using a hydraulic excavator as an example.

Figure 1:
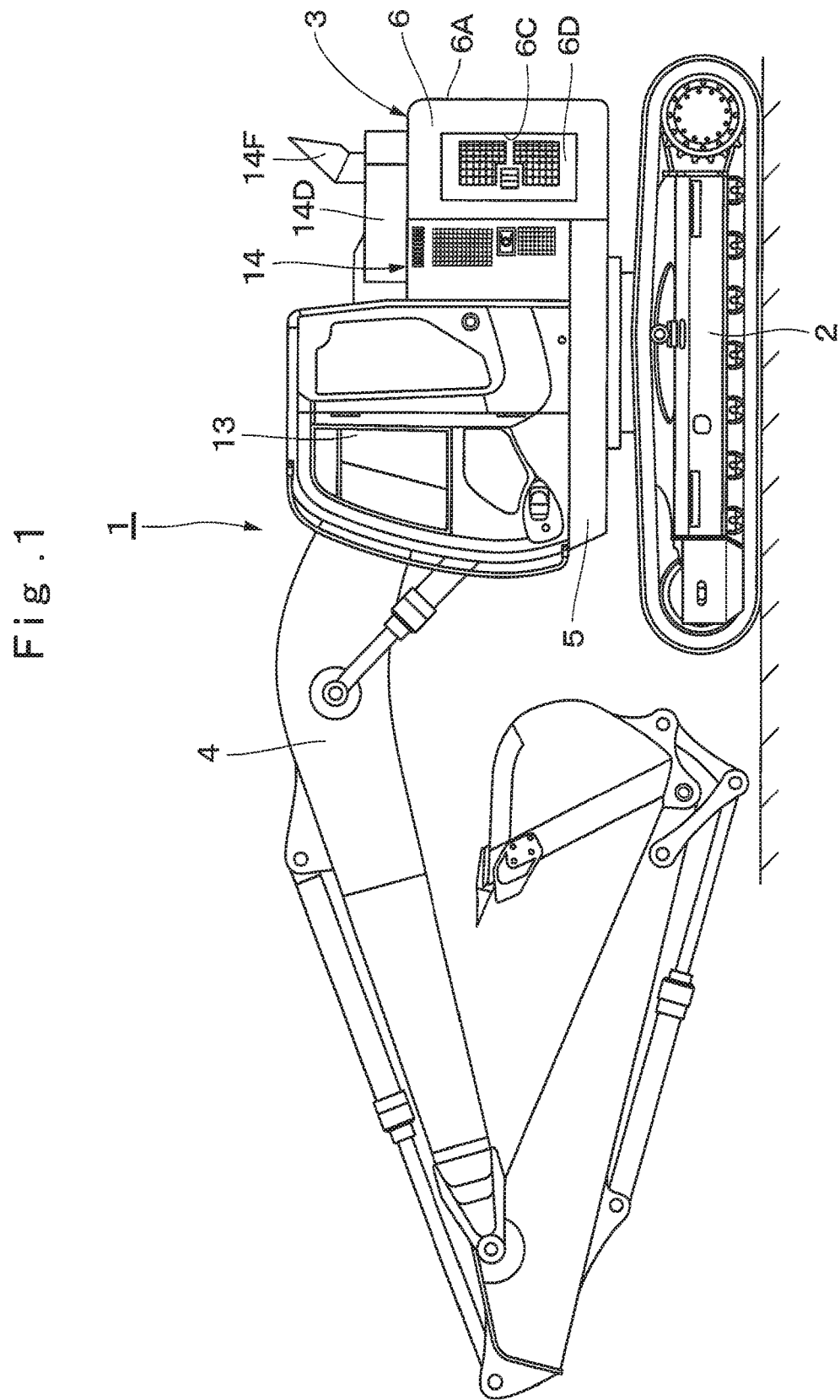
FIG. 1 is a left side view showing a hydraulic excavator according to an embodiment of the present invention.
Figure 2:
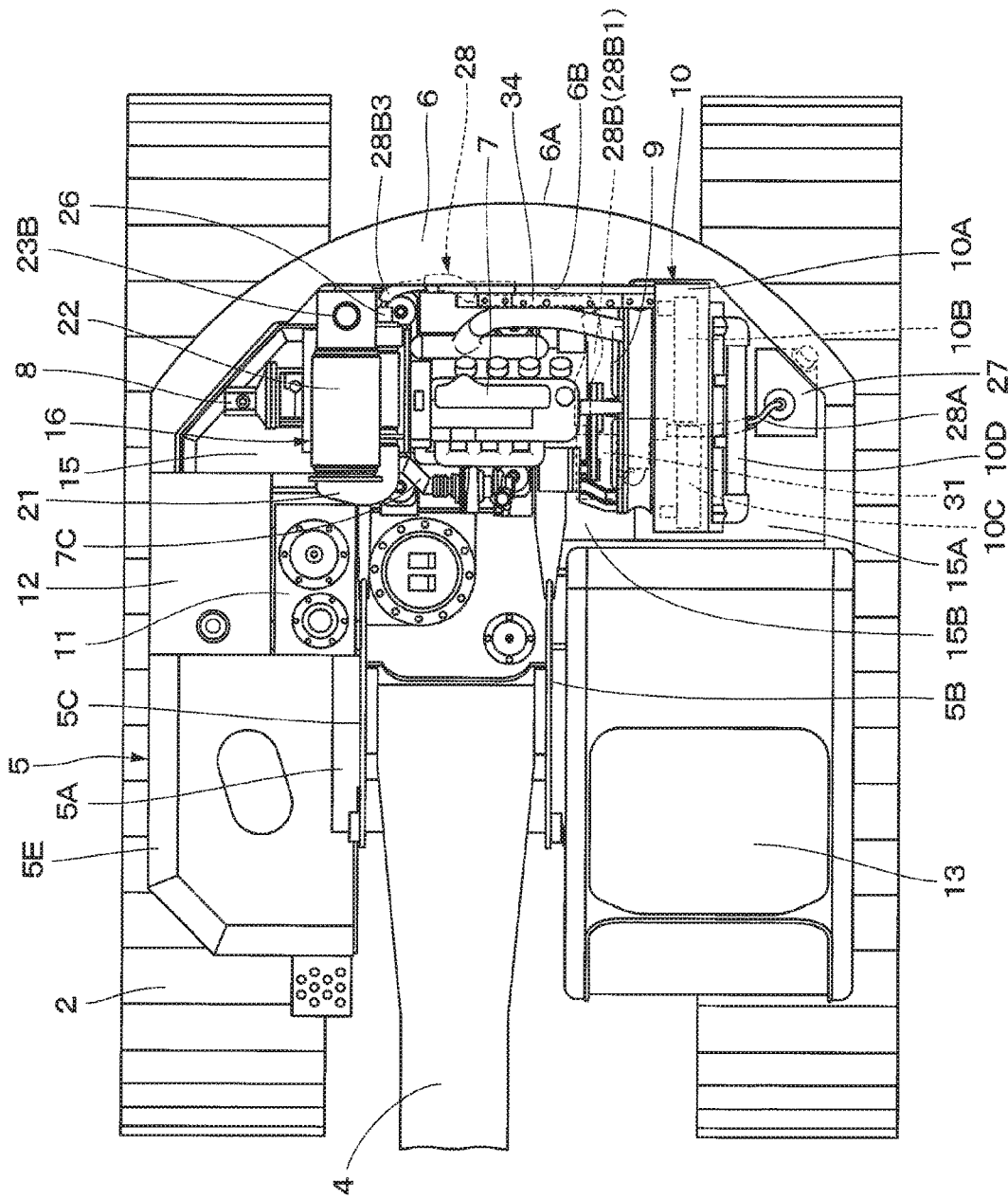
FIG. 2 is a plan view of the hydraulic excavator when seen from above in a state where an exterior cover is omitted.

In FIG. 1, a hydraulic excavator 1 which is a representative example of a construction machine has a self-propelled crawler-type lower traveling structure 2 and an upper revolving structure 3 rotatably mounted on the lower traveling structure 2. A working mechanism 4 is provided capable of moving upward/downward on a front side of the upper revolving structure 3, and an excavating work of earth and sand and the like by using this working mechanism 4 is performed.

Figure 4:
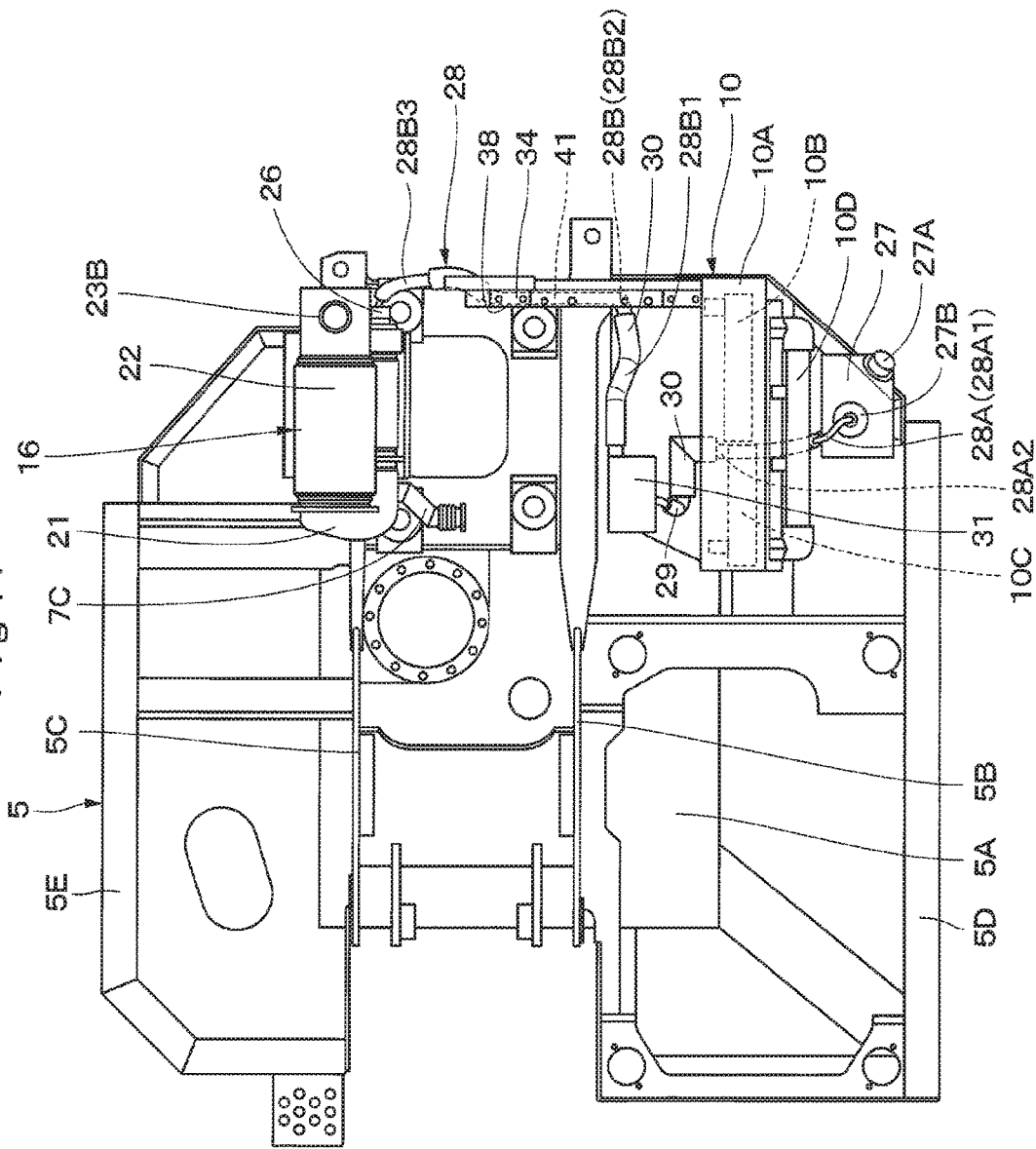
FIG. 4 is a plan view showing a state where a heat exchanger, a urea water tank, a urea water pump, a urea water supply line, a horizontal support member, an exhaust gas purifying device and the like are arranged on a revolving frame.
Figure 5:
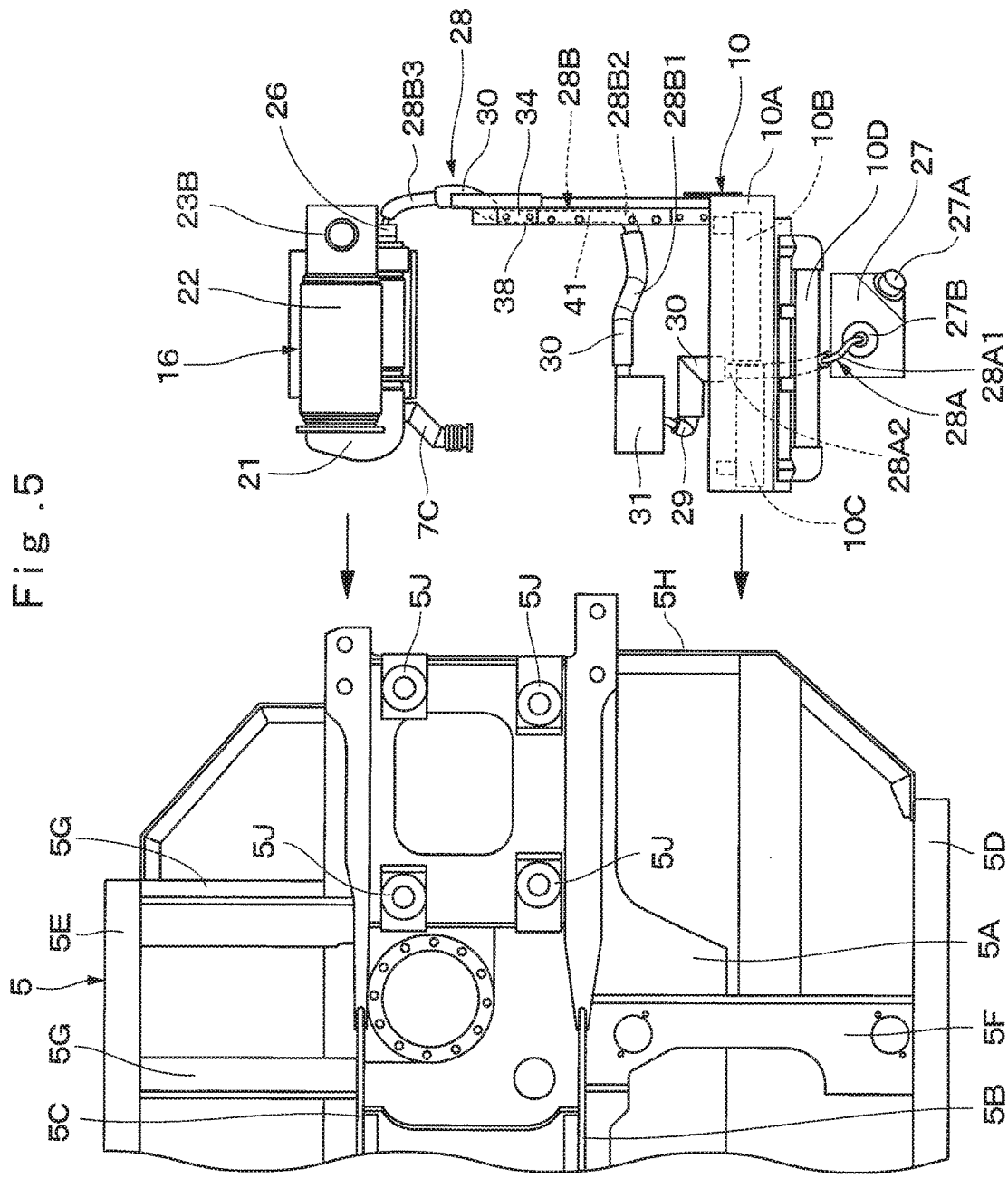
FIG. 5 is a partially broken exploded view showing a state where the urea water tank, the urea water pump, the urea water supply line, the horizontal support member, the exhaust gas purifying device and the like are removed from the revolving frame in FIG. 4.
Figure 6:
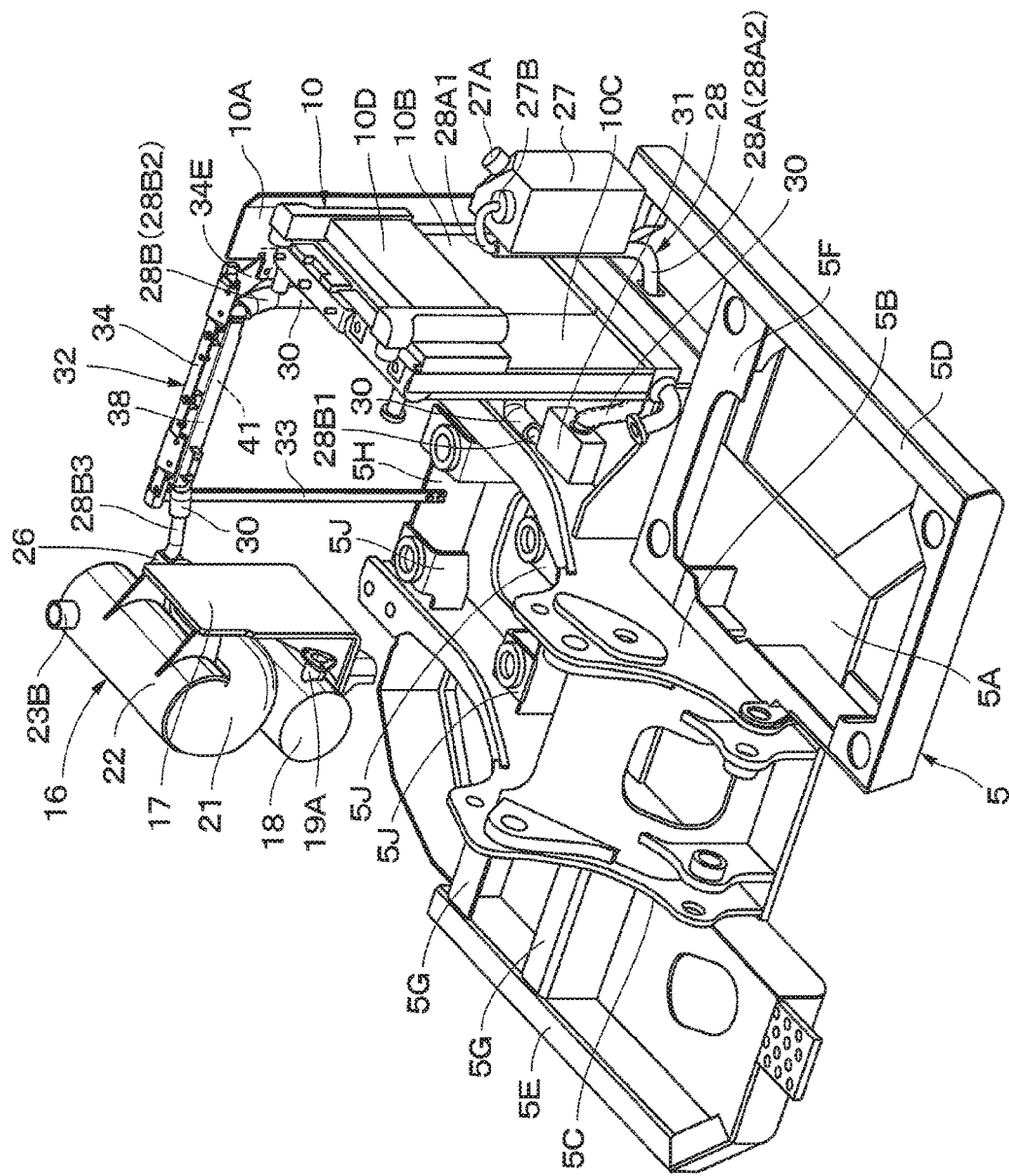
FIG. 6 is a perspective view showing a state where the heat exchanger, the urea water tank, the urea water pump, the urea water supply line, the horizontal support member, the exhaust gas purifying device and the like are arranged on the revolving frame.

A revolving frame 5 forms a support structural body which becomes a base for the upper revolving structure 3. As shown in FIGS. 4 to 6, the revolving frame 5 has a bottom plate 5A made of a thick steel plate or the like extending to a front-and-rear direction, a left vertical plate 5B, a right vertical plate 5C provided upright on the bottom plate 5A and extending in the front-and-rear direction at a predetermined interval in a left-and-right direction, a left side frame 5D arranged on a left side of the left vertical plate 5B at an interval and extending in the front-and-rear direction, and a right side frame 5E arranged on a right side of the right vertical plate 5C at an interval and extending in the front-and-rear direction. Moreover, the revolving frame 5 has a left extension beam 5F extended in a left direction from the bottom plate 5A and the left vertical plate 5B and supporting the left side frame 5D on a distal end portion, a right extension beam 5G extended in a right direction from the bottom plate 5A and the right vertical plate 5C and supporting the right side frame 5E on a distal end portion, and a rear plate 5H extending in the left-and-right direction between rear end portions of the left side frame 5D and the right side frame 5E.

On the other hand, four engine brackets 5J, for example, are provided on a rear side of the revolving frame 5 positioned between the left vertical plate 5B and the right vertical plate 5C. An engine 7 which will be described later is mounted on each of these engine brackets 5J. A foot portion of the working mechanism 4 is mounted, capable of moving upward/downward on front end sides of the left and right vertical plates 5B, 5C. A counterweight 6 which will be described later is mounted on rear end portions of the left vertical plate 5B and the right vertical plate 5C.

The counterweight 6 is provided on the rear side of the revolving frame 5 and takes a weight balance with the working mechanism 4. A rear surface 6A of the counterweight 6 is formed having an arc shape around a revolving center of the upper revolving structure 3 and is constituted so as to be substantially contained in a vehicle width of the lower traveling structure 2 in a revolving operation of the upper revolving structure 3. A maintenance opening 6C penetrating the rear surface 6A and a front surface 6B and a maintenance cover 6D covering this maintenance opening 6C capable of being opened/closed are provided on a left end side of the counterweight 6.

The engine 7 is provided on the rear side of the revolving frame 5 located on the front side of the counterweight 6. The engine 7 has four mounting legs 7A corresponding to each of the engine brackets 5J of the revolving frame 5. Each of the mounting legs 7A is mounted on each of the engine brackets 5J through a vibration isolating mount. As a result, the engine 7 is mounted on the revolving frame 5 in a horizontal position where a crank shaft (not shown) extends in the left-and-right direction. A pump mounting part 7B is provided on a right side of the engine 7. A hydraulic pump 8 is mounted on this pump mounting part 7B, and a mounting base 17 of an exhaust gas purifying device 16 which will be described later is mounted. Moreover, a first exhaust gas post-treatment device 18 of the exhaust gas purifying device 16 is connected to an exhaust pipe 7C of the engine 7.

A cooling fan 9 is mounted on the left side of the engine 7. The cooling fan 9 suctions an outside air as a cooling air by rotating with the engine 7 as a power source and supplies this cooling air to a heat exchanger 10 which will be described later. The cooling air by the cooling fan 9 passes through the heat exchanger 10 and flows to the engine 7 side.

The heat exchanger 10 is arranged closer to the upstream side in the flow direction of the cooling air than the cooling fan 9. The heat exchanger 10 is provided on a rear left side of the revolving frame 5 in a state faced with the cooling fan 9. The heat exchanger 10 is constituted by a support frame 10A provided upright on the revolving frame 5, a radiator 10B, an oil cooler 10C, an intercooler 10D and the like supported by this support frame 10A. The heat exchanger 10 is to cool various kinds of fluids whose temperatures have risen by the cooling air supplied by the cooling fan 9. Moreover, the support frame 10A of the heat exchanger 10 supports a left end side of a horizontal support member 34 which will be described later at its upper-part position.

A hydraulic oil tank 11 and a fuel tank 12 are provided by being juxtaposed in the left-and-right direction on the front side of the hydraulic pump 8. The hydraulic oil tank 11 is formed as a rectangular parallelepiped container extending in the up-and-down direction and stores a hydraulic oil for driving various kinds of hydraulic actuators mounted on the hydraulic excavator 1. The fuel tank 12 is arranged adjacent to a right side of the hydraulic oil tank 11. The fuel tank 12 is formed as a rectangular parallelepiped container extending in the up-and-down direction and stores a fuel to be supplied to the engine 7.

A cab 13 is mounted on a front left side of the revolving frame 5. The cab 13 defines a driver's cab which an operator gets onboard. A driver's seat on which the operator is seated, an operation lever for traveling, an operation lever for work and the like (none of them is shown) are disposed inside the cab 13.

Figure 3:
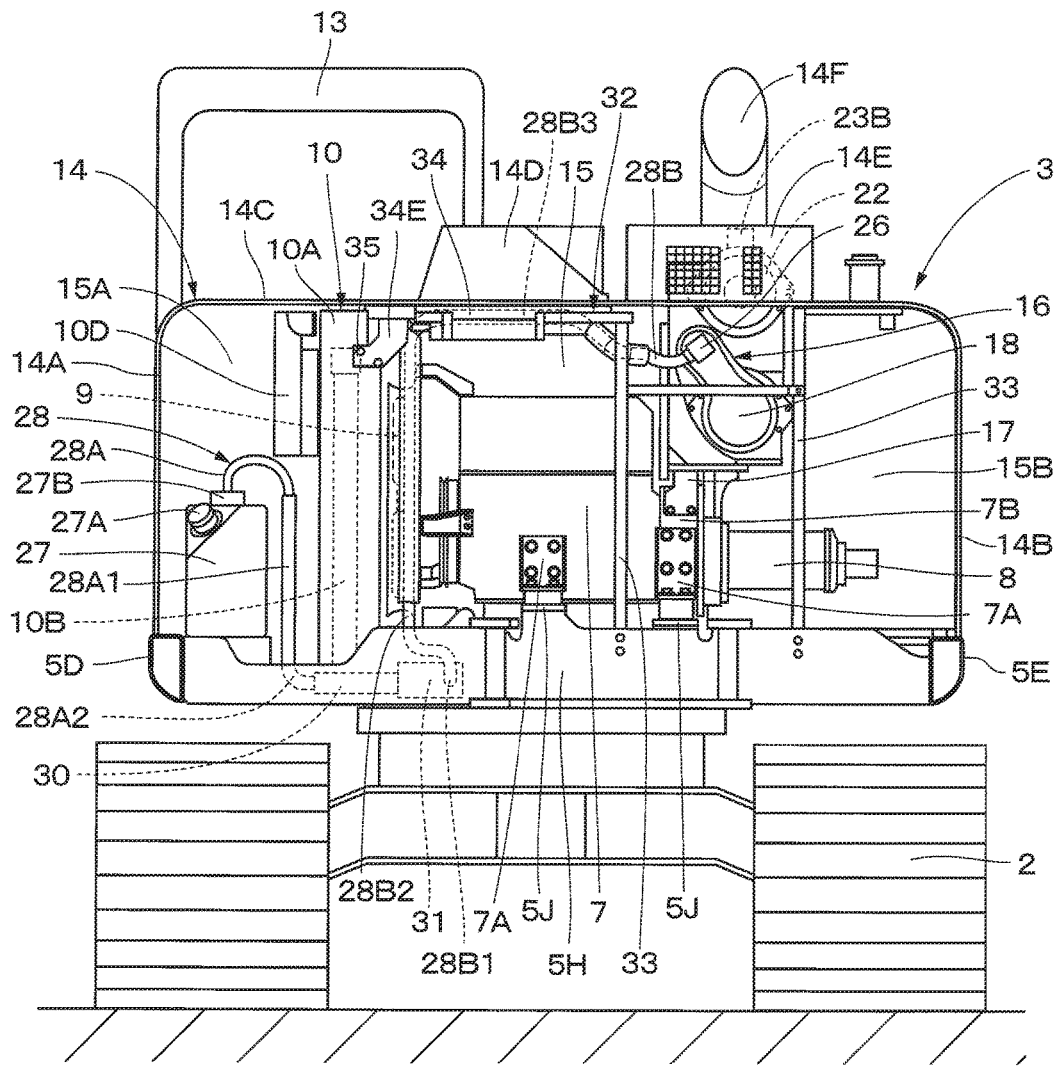
FIG. 3 is a rear view of the hydraulic excavator when seen from rear in a state where a counterweight is omitted.

An exterior cover 14 is arranged between the counterweight 6 and the cab 13 and is provided on the revolving frame 5 in a state extending in the left-and-right direction. As shown in FIG. 3, the exterior cover 14 is constituted by including a left surface plate 14A covering the heat exchanger 10 and the like from a left side, a right surface plate 14B covering the hydraulic pump 8 and the like from a right side, a top surface plate 14C covering the heat exchanger 10, the hydraulic pump 8 and the like from above, an engine cover 14D, and a purifying device cover 14E. The engine cover 14D protrudes upward from the top surface plate 14C and covers the engine 7 and the like from above. The purifying device cover 14E is arranged adjacent to a right side of the engine cover 14D and covers the exhaust gas purifying device 16 which will be described later. A tail pipe 14F for discharging the exhaust gas to an outside is provided on the purifying device cover 14E by protruding upward.

A machine room 15 is defined by the exterior cover 14 on the revolving frame 5 and accommodates the engine 7, the hydraulic pump 8, the cooling fan 9, the heat exchanger 10, the exhaust gas purifying device 16, a urea water tank 27 and the like inside. Here, the machine room 15 is roughly divided into a heat exchanger upstream room 15A located closer to an upstream side in the flow direction of the cooling air than the heat exchanger 10 and an engine room 15B located closer to a downstream side in the flow direction of the cooling air than the heat exchanger 10.

The heat exchanger upstream room 15A is surrounded by the heat exchanger 10, the counterweight 6, the left surface plate 14A and the top surface plate 14C of the exterior cover 14. The urea water tank 27 and the like are arranged inside the heat exchanger upstream room 15A. On the other hand, the engine room 15B is surrounded by the heat exchanger 10, the counterweight 6, the right surface plate 14B and the top surface plate 14C of the exterior cover 14. The engine 7, the hydraulic pump 8, the exhaust gas purifying device 16 and the like are arranged inside the engine room 15B. The cooling air by the cooling fan 9 flows from the heat exchanger upstream room 15A to the engine room 15B through the heat exchanger 10. Therefore, the temperature in the heat exchanger upstream room 15A is kept lower than the temperature in the engine room 15B.

Figure 7:
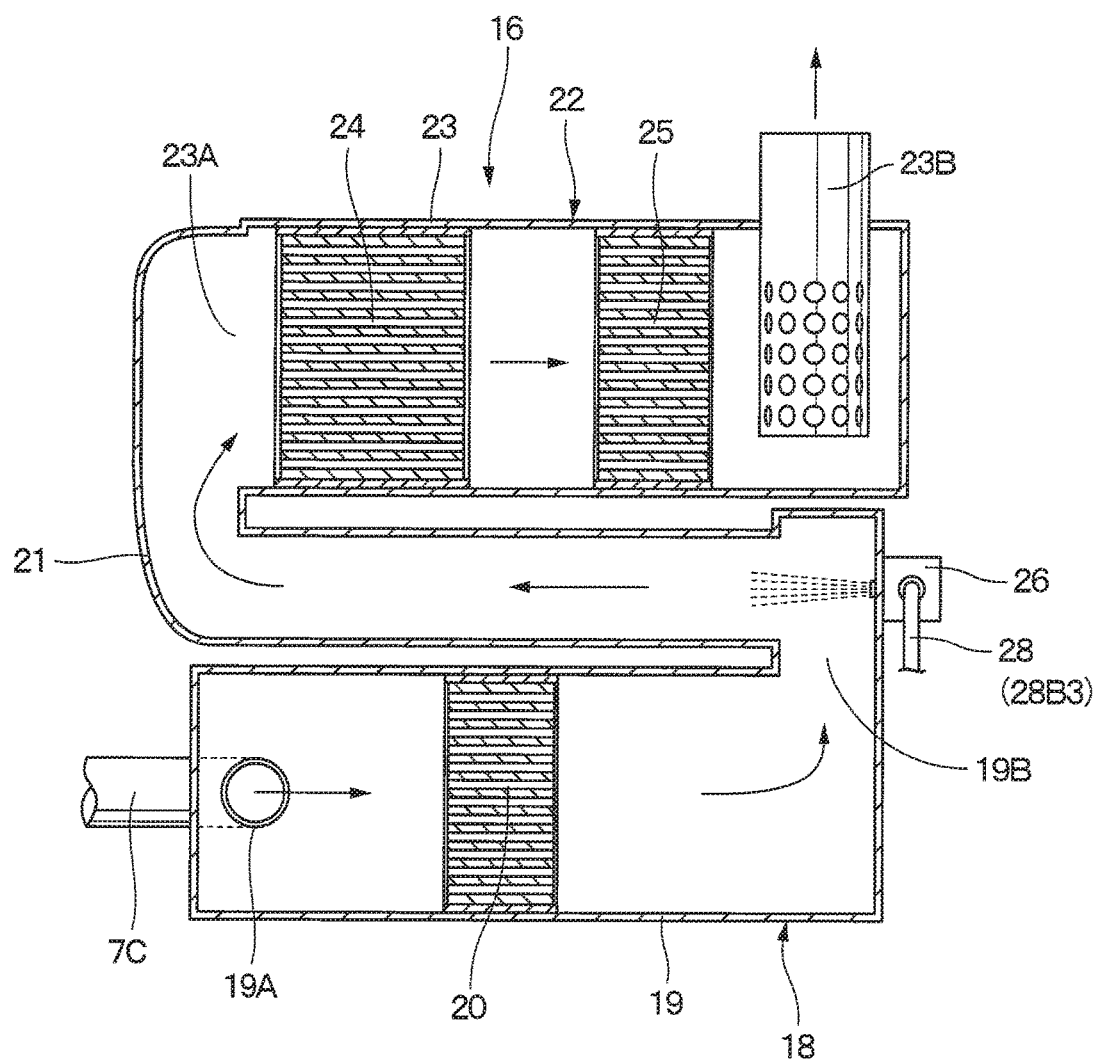
FIG. 7 is a sectional view schematically showing the exhaust gas purifying device.
Figure 8:
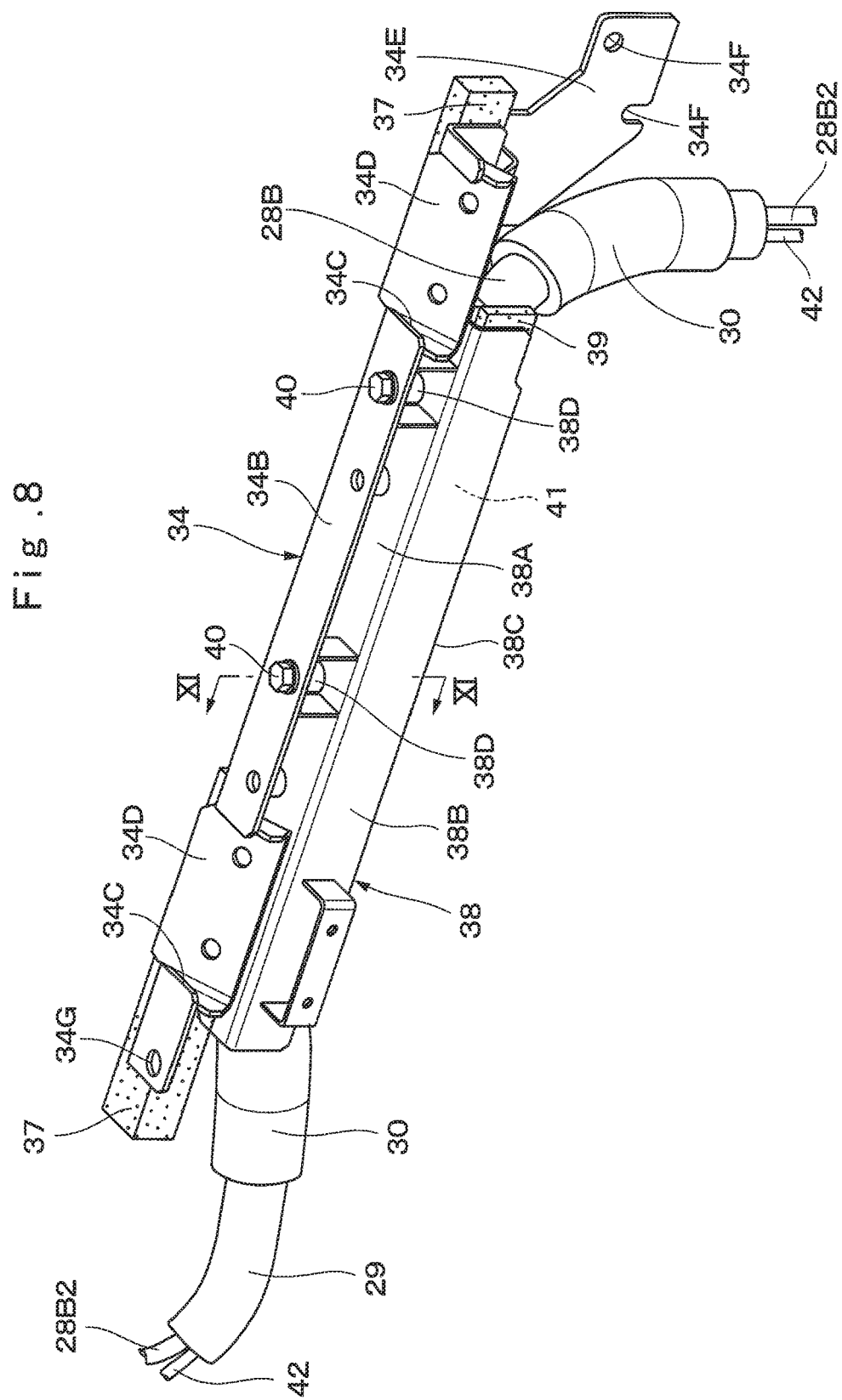
FIG. 8 is a perspective view showing the urea water supply line, the horizontal support member, and a heat-shielding cover in FIG. 6 in an enlarged manner.

The exhaust gas purifying device 16 is provided by being connected to an exhaust side of the engine 7. This exhaust gas purifying device 16 removes carbon monoxide (CO), hydrocarbon (HC) and the like contained in the exhaust gas discharged from the engine 7 by oxidation, purifies nitrogen oxides (NOx) contained in the exhaust gas and moreover, reduces an exhaust noise. As shown in FIGS. 3 and 6, the exhaust gas purifying device 16 has the mounting base 17, and this mounting base 17 is mounted on the pump mounting part 7B of the engine 7 together with the hydraulic pump 8. As a result, the exhaust gas purifying device 16 is arranged above the hydraulic pump 8. As shown in FIG. 7, the exhaust gas purifying device 16 is constituted by including the first exhaust gas post-treatment device 18 which will be described later, a connecting pipe 21, a second exhaust gas post-treatment device 22 and the like.

The first exhaust gas post-treatment device 18 is connected to an outlet side of the exhaust pipe 7C of the engine 7. The first exhaust gas post-treatment device 18 is constituted by including a cylindrical case 19 extended in the front-and-rear direction and an oxidation catalyst 20 arranged in the cylindrical case 19. The cylindrical case 19 is formed as a cylindrical sealed container, and a supply port 19A made of a tubular body is provided on an upstream side (front side portion) of the cylindrical case 19 by protruding in a radial direction. An outlet side of the exhaust pipe 7C is connected to a protruding end side of the supply port 19A protruding to an outside of the cylindrical case 19. An exhaust port 19B opened in the radial direction is provided on a downstream side (rear side portion) of the cylindrical case 19.

The oxidation catalyst 20 is arranged in the cylindrical case 19. The oxidation catalyst 20 is made of a cell-state cylindrical body made of ceramics, for example, a large number of through holes is formed in an axial direction thereof, and an inner surface is coated with noble metal or the like. The oxidation catalyst 20 is to oxidize and to remove carbon monoxide (CO), hydrocarbon (HC) and the like contained in the exhaust gas by making the exhaust gas flow through each of the through holes at a predetermined temperature.

The connecting pipe 21 connects the first exhaust gas post-treatment device 18 and the second exhaust gas post-treatment device 22 to each other. The connecting pipe 21 is arranged on an outer peripheral side of the first exhaust gas post-treatment device 18 and extends in the front-and-rear direction substantially in parallel with the first exhaust gas post-treatment device 18. The connecting pipe 21 connects the exhaust port 19B of the cylindrical case 19 and the supply port 23A of a cylindrical case 23 constituting the second exhaust gas post-treatment device 22 to each other. The connecting pipe 21 is to lead the exhaust gas discharged from the first exhaust gas post-treatment device 18 to the second exhaust gas post-treatment device 22.

The second exhaust gas post-treatment device 22 is connected to the first exhaust gas post-treatment device 18 through the connecting pipe 21. The second exhaust gas post-treatment device 22 is arranged at a position overlapping an upper side of the first exhaust gas post-treatment device 18 with the connecting pipe 21 between them and extends in the front-and-rear direction substantially in parallel with the first exhaust gas post-treatment device 18. The second exhaust gas post-treatment device 22 is constituted by including the cylindrical case 23 having a cylindrical shape, a urea selective reduction catalyst 24 arranged in the cylindrical case 23, and an oxidation catalyst 25 arranged on the downstream side of the urea selective reduction catalyst 24.

The cylindrical case 23 is formed as a sealed container by closing both ends of a cylindrical body. The supply port 23A opened in the radial direction is provided on a front side portion which becomes an upstream side of the cylindrical case 23. An outlet side of the connecting pipe 21 is connected to the supply port 23A. On the other hand, an exhaust port 23B made of a tubular body is provided on a rear side portion which becomes a downstream side of the cylindrical case 23 by protruding upward from an inside to an outside of the cylindrical case 23 in the radial direction. A protruding end side of the exhaust port 23B protruding to the outside of the cylindrical case 23 is connected to a tail pipe 14F of the purifying device cover 14E. A large number of through holes is provided on a lower side of the exhaust port 23B arranged in the cylindrical case 23, and by passage of the exhaust gas through each of these through holes, an exhaust noise is reduced (muffled).

The urea selective reduction catalyst 24 is arranged on the upstream side of the cylindrical case 23. The urea selective reduction catalyst 24 is made of a cell-state cylindrical body made of ceramics, for example, a large number of through holes is formed in the axial direction thereof, and an inner surface is coated with noble metal. This urea selective reduction catalyst 24 is to selectively subject nitrogen oxides (NOx) contained in the exhaust gas discharged from the engine 7 to a reduction reaction by ammonia generated from the urea aqueous solution and to decompose it to a harmless nitrogen gas and water.

The oxidation catalyst 25 is arranged on the downstream side of the cylindrical case 23. The oxidation catalyst 25 is made of a cell-state cylindrical body made of ceramics substantially similarly to the aforementioned oxidation catalyst 20, a large number of through holes is formed in an axial direction thereof, and an inner surface is coated with noble metal. As a result, the oxidation catalyst 25 oxides residue ammonia staying after reduction of the nitrogen oxidizes by the urea selective reduction catalyst 24 and separates it to the nitrogen gas and water.

A urea water injection valve 26 is provided on the connecting pipe 21 of the exhaust gas purifying device 16. The urea water injection valve 26 is connected to the urea water tank 27 through a urea water supply line 28 which will be described later. The urea water injection valve 26 is arranged closer to the upstream side than the urea selective reduction catalyst 24 and injects the urea water (urea aqueous solution) which is a reducing agent toward the exhaust gas flowing through the connecting pipe 21.

The urea water tank 27 is provided on the rear left side of the revolving frame 5. That is, the urea water tank 27 is located closer to the rear side than the cab 13 and is arranged in the heat exchanger upstream room 15A. The urea water tank 27 is to store the urea water as the reducing agent to be supplied to the urea water injection valve 26. In this case, the urea water tank 27 is arranged in the heat exchanger upstream room 15A which becomes the upstream side of the heat exchanger 10 in the flow direction of the cooling air to be supplied into the machine room 15 by the cooling fan 9. As a result, a temperature rise of the urea water in the urea water tank 27 caused by the heat generated by the engine 7 or the like can be suppressed.

A water supply port 27A is provided on the rear side of the urea water tank 27 at a position corresponding to the maintenance opening 6C of the counterweight 6, and a urea water is supplied into the urea water tank 27 through this water supply port 27A. Moreover, a lid member 27B is provided on an upper side of the urea water tank 27, and one end side of the urea water supply line 28 which will be described later is mounted on this lid member 27B.

The urea water supply line 28 is arranged through the machine room 15 and connects the urea water tank 27 and the urea water injection valve 26 to each other. A urea water pump 31 which will be described later is provided in the middle of the urea water supply line 28, and the urea water supply line 28 is constituted by a tank-side supply line 28A connecting the urea water tank 27 and the urea water pump 31 to each other and an injection-valve side supply line 28B connecting the urea water pump 31 and the urea water injection valve 26 to each other. The urea water supply line 28 is formed by using a pressure-resistant hose having flexibility, for example, and is covered by a tubular heat insulating material 29 over an entire length thereof. The tubular heat insulating material 29 is formed cylindrically by using a foaming resin material, for example, and the urea water supply line 28 is inserted to an inside thereof. As a result, the tubular heat insulating material 29 shields the urea water supply line 28 from heat.

Here, as shown in FIGS. 3 to 5, the tank-side supply line 28A has a tank-side downward line 28A1 and a tank-side horizontal line 28A2. The tank-side downward line 28A1 extends downward from the urea water tank 27 toward the bottom plate 5A of the revolving frame 5. The tank-side horizontal line 28A2 extends horizontally from a lower end of the tank-side downward line 28A1 toward the urea water pump 31 through a lower side of the heat exchanger 10. Here, a portion in the tank-side horizontal line 28A2 arranged in the engine room 15B is covered by a large-diameter tubular heat insulating material 30 molded having a large-diameter cylindrical shape by using a resin material thicker than the tubular heat insulating material 29. That is, a portion in the tank-side horizontal line 28A2 arranged in the engine room 15B is covered in double by the tubular heat insulating material 29 and the large-diameter tubular heat insulating material 30. As a result, the urea water flowing through the tank-side supply line 28A is shielded from heat so that the temperature does not rise by the heat generated by the engine 7 or the like.

On the other hand, the injection-valve side supply line 28B has an injection-valve side rearward line 28B1, an injection-valve side upward line 28B2, and an injection-valve side horizontal line 28B3. The injection-valve side rearward line 28B1 extends rearward from the urea water pump 31 toward the rear plate 5H along the left vertical plate 5B of the revolving frame 5. The injection-valve side upward line 28B2 extends upward from a rear end of the injection-valve side rearward line 28B1 along the front surface 6B of the counterweight 6. The injection-valve side horizontal line 28B3 extends horizontally to the right from an upper end of the injection-valve side upward line 28B2 toward the urea water injection valve 26 along the upper end of the counterweight 6. The injection-valve side rearward line 28B1 and the injection-valve side upward line 28B2 are further covered by the large-diameter tubular heat insulating material 30 arranged on an outer peripheral side of the tubular heat insulating material 29. That is, the injection-valve side rearward line 28B1 and the injection-valve side upward line 28B2 arranged in the engine room 15B are covered in double by the tubular heat insulating material 29 and the large-diameter tubular heat insulating material 30. As a result, heat is shielded so that a temperature of the urea water flowing through the injection-valve side supply line 28B does not rise by the heat generated by the engine 7 or the like.

Here, in this embodiment, since the injection-valve side horizontal line 28B3 of the urea water supply line 28 is arranged in an upper-side region of the engine room 15B which is usually a dead space, this dead space can be effectively utilized. However, the heat generated by the engine 7, the hydraulic pump 8 and the like stays in the upper-side region of the engine room 15B. Thus, the injection-valve side horizontal line 28B3 extending in the left-and-right direction along the upper end of the counterweight 6 is susceptible to an influence of the heat from the engine 7 or the like. On the other hand, in this embodiment, the injection-valve side horizontal line 28B3 of the injection-valve side supply line 28B is accommodated in a line accommodating space 41 formed by a horizontal support member 34 and a heat shield cover 38 which will be described later.

The urea water pump 31 is arranged on the bottom plate 5A by being located closer to the left side than the left vertical plate 5B of the revolving frame 5. This urea water pump 31 is to press-feed the urea water stored in the urea water tank 27 toward the urea water injection valve 26. The tank-side supply line 28A (tank-side horizontal line 28A2) is connected to a suction side of the urea water pump 31, and the injection-valve side supply line 28B (injection-valve side rearward line 28B1) is connected to an ejection side of the urea water pump 31.

The support member 32 is arranged on the front side of the counterweight 6 and supports the exterior cover 14. As shown in FIGS. 3 and 6, the support member 32 is constituted by including a plurality of vertical support members 33 (only two of them are shown) whose lower ends are fixed to the rear plate 5H of the revolving frame 5 and extending in the up-and-down direction and a horizontal support member 34. The horizontal support member 34 is connected to an upper-part position of the support frame 10A of the heat exchanger 10 and an upper part position of the vertical support member 33 and extends in the left-and-right direction along the upper end of the counterweight 6.

Here, as shown in FIGS. 8 to 11, the horizontal support member 34 is formed by using a steel plate material or the like bent into an inverted L-shape. Specifically, the horizontal support member 34 has a front surface plate 34A faced with the front surface 6B of the counterweight 6 at an interval in the front-and-rear direction and extending in the left-and-right direction and a top surface plate 34B bent forward from an upper end of the front surface plate 34A. A notch part 34C notched having a rectangular shape from a front end edge of the top surface plate 34B toward the front surface plate 34A is formed on both sides of the top surface plate 34B in a length direction (left-and-right direction), respectively. A cover mounting plate 34D inclined forward from the front surface plate 34A diagonally downward is fixed to each of these notch parts 34C. It is constituted such that the engine cover 14D is mounted on each of the cover mounting plates 34D through a hinge member (not shown).

Here, a bracket 34E protruding to the left side is integrally formed on a left end side of the front surface plate 34A, and two bolt through parts 34F are provided on this bracket 34E. On the other hand, a bolt through hole 34G is provided on a right end side of the top surface plate 34B. And as shown in FIG. 3, regarding the horizontal support member 34, a bolt 35 inserted into the bolt through part 34F of the bracket 34E is screwed with the upper part position of the support frame 10A of the heat exchanger 10 and a bolt (not shown) inserted into the bolt through hole 34G of the top surface plate 34B is screwed with the upper part position of the vertical support member 33. As a result, the horizontal support member 34 is fixed between the support frame 10A of the heat exchanger 10 and the vertical support member 33. Moreover, two bolt through holes 34H for mounting the heat shield cover 38 which will be described later are provided between each of the notch parts 34C on the top surface plate 34B.

Figure 10:
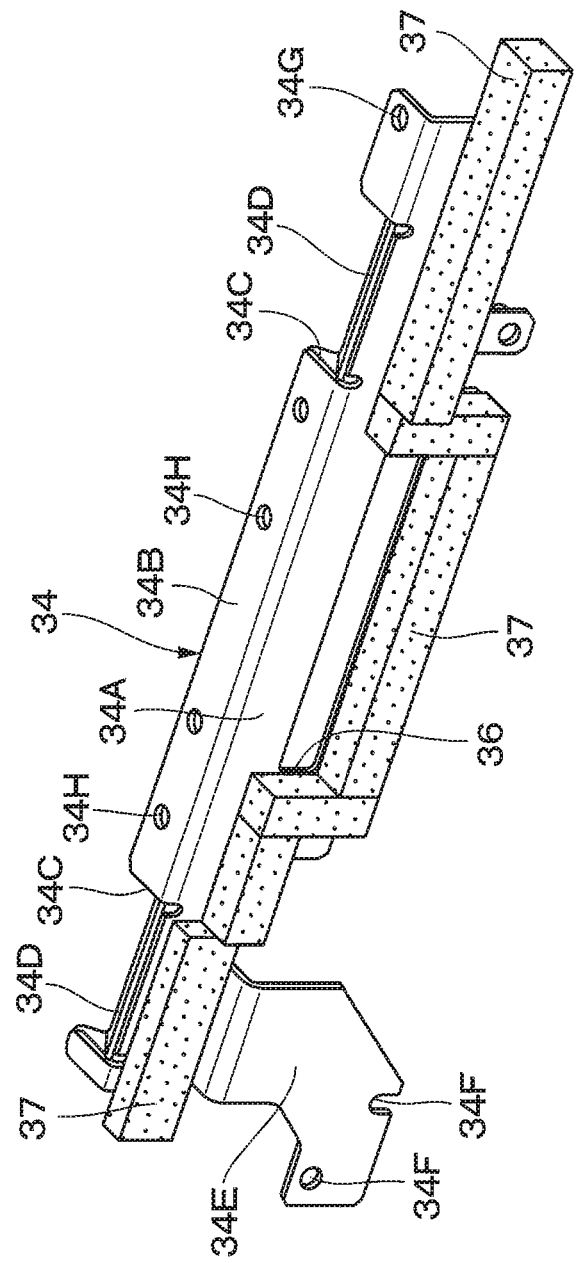
FIG. 10 is a perspective view of the horizontal support member when seen from the rear side.
Figure 11:
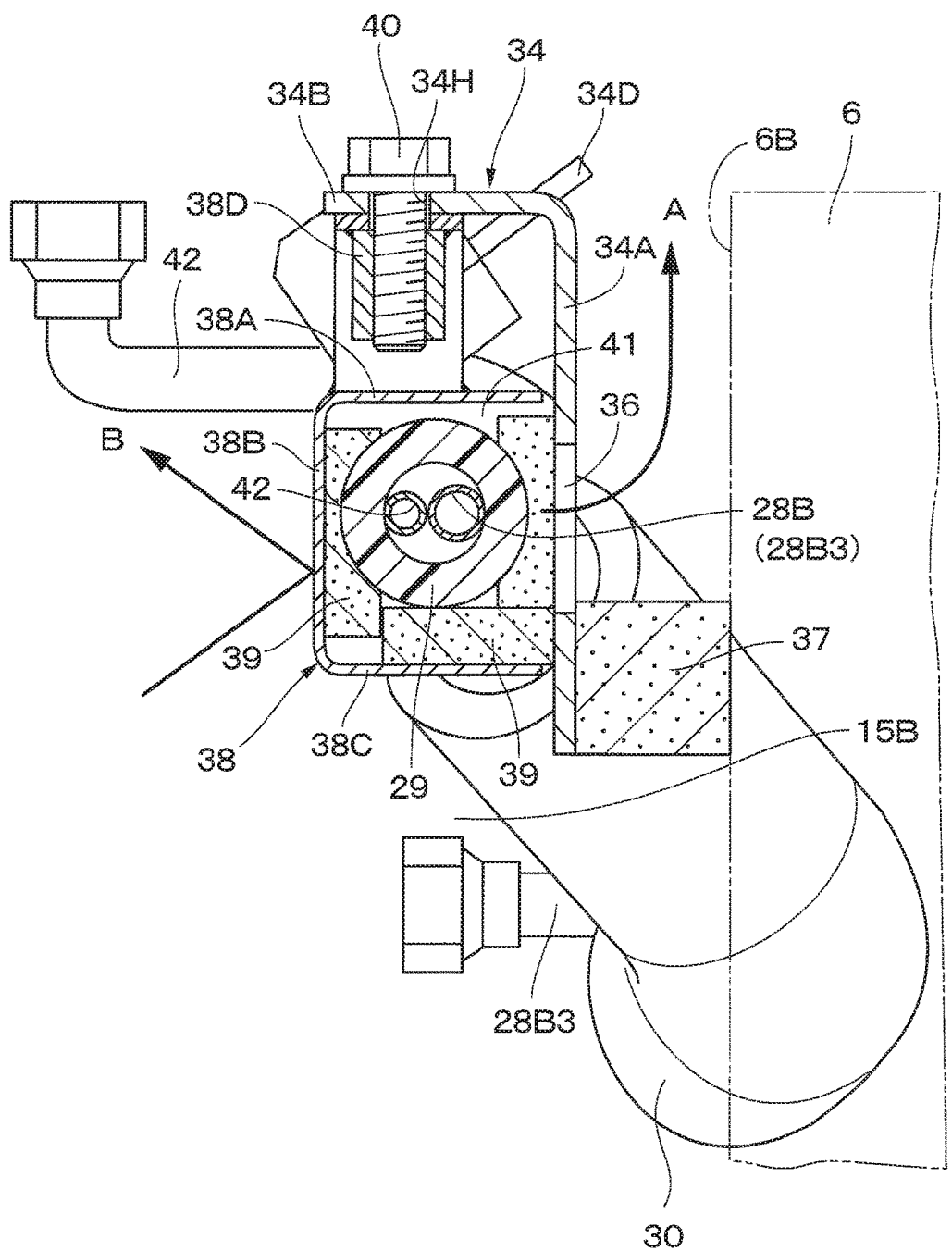
FIG. 11 is an enlarged sectional view showing the urea water supply line, the horizontal support member, the heat-shielding cover, and a line accommodating space when seen from an arrow XI-XI direction in FIG. 8.

An opening part 36 is provided in the front surface plate 34A faced with the front surface 6B of the counterweight 6. This opening part 36 is formed by a rectangular square hole extending in the left-and-right direction and opens the line accommodating space 41 which will be described later to an outside air. Moreover, as shown in FIG. 10, a plurality of columnar shape heat insulating materials 37 is provided by being located on the surface in the horizontal support member 34 faced with the front surface 6B of the counterweight 6. This columnar shape heat insulating material 37 is formed having a square columnar shape by using a foaming resin material, for example, and is mounted so as to surround a periphery of the opening part 36. As shown in FIG. 11, each of the columnar shape heat insulating materials 37 separates the engine room 15B from the opening part 36 by being brought into contact with the front surface 6B of the counterweight 6. As a result, inflow of a hot air in the engine room 15B into the line accommodating space 41 through the opening part 36 is prevented.

Subsequently, the heat shield cover 38 and the line accommodating space 41 used in this embodiment will be described.

Figure 9:
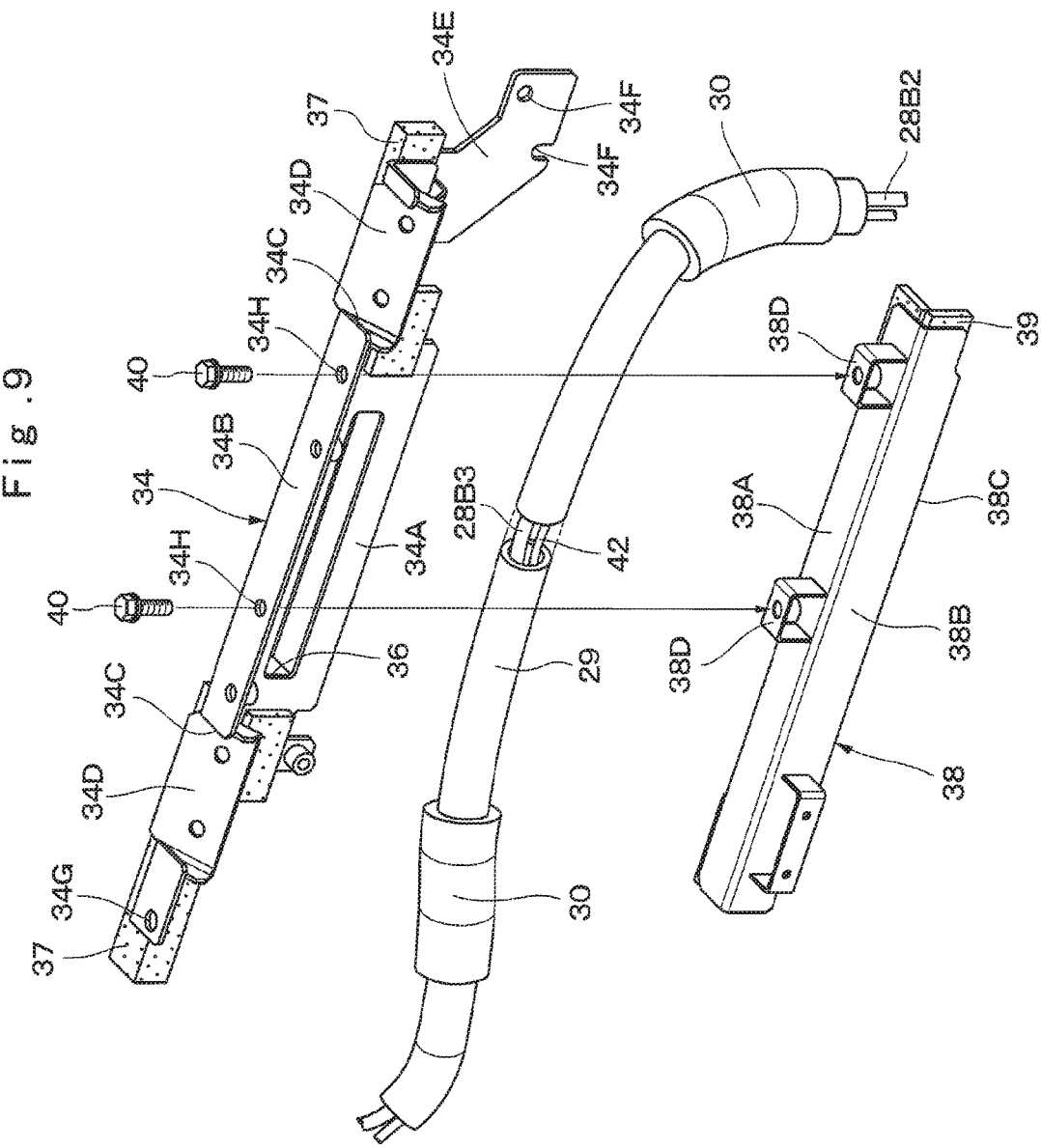
FIG. 9 is an exploded perspective view showing the urea water supply line, the horizontal support member, and the heat shielding cover in an exploded manner.

The heat shield cover 38 is mounted on the horizontal support member 34 and forms the line accommodating space 41 which will be described later between it and the horizontal support member 34. As shown in FIGS. 9 and 11, the heat shield cover 38 is formed by using the steel plate material or the like bent having an inverted U-shape and extends in the left-and-right direction along the horizontal support member 34.

The heat shield cover 38 has an top surface plate 38A faced with the top surface plate 34B of the horizontal support member 34 in the up-and-down direction, a front surface plate 38B extending downward from the front end of the top surface plate 38A, and a bottom surface plate 38C extending rearward from the lower end of the front surface plate 38B. The front surface plate 38B is faced with the front surface plate 34A of the horizontal support member 34 at an interval in the front-and-rear direction. The bottom surface plate 38C is faced with the top surface plate 38A at an interval in the up-and-down direction. A screw seat 38D having a female screw hole is fixed by using means such as welding or the like at two spots corresponding to each of the bolt through holes 34H of the horizontal support member 34 in the top surface plate 38A. Moreover, a plate-shaped heat insulating material 39 formed having a thin plate shape by using a foaming resin material, for example, is mounted on an inner side surface in the heat shield cover 38 on the line accommodating space 41 side.

Then, a bolt 40 inserted into each of the bolt through holes 34H of the horizontal support member 34 is screwed with each of the screw seats 38D of the heat shield cover 38 so that the heat shield cover 38 is fixed to the horizontal support member 34. In this state, as shown in FIG. 11, the line accommodating space 41 having a square section is formed between the horizontal support member 34 and the heat shield cover 38.

A portion in the urea water supply line 28 susceptible to an influence of the heat from the engine 7 or the like, that is, the injection-valve side horizontal line 28B3 of the injection-valve side supply line 28B arranged in the engine room 15B is accommodated in the line accommodating space 41. The injection-valve side horizontal line 28B3 accommodated in the line accommodating space 41 is covered by the tubular heat insulating material 29, and an outer peripheral side of the tubular heat insulating material 29 is further covered by each plate-shaped heat insulating material 39 mounted on the inner side surface of the heat shield cover 38. Therefore, the injection-valve side horizontal line 28B3 accommodated in the line accommodating space 41 is covered in double by the tubular heat insulating material 29 and the plate-shaped heat insulating material 39.

As a result, as shown in FIG. 11, the hot air B radiated from the engine 7 or the like toward the injection-valve side supply line 28B can be shielded by the heat shield cover 38. As a result, the temperature rise of the urea water flowing through the injection-valve side horizontal line 28B3 accommodated in the line accommodating space 41 can be suppressed. Moreover, since the line accommodating space 41 is open to the outside air at all times through the opening part 36 provided on the horizontal support member 34, the line accommodating space 41 does not become a closed sectional space. As a result, even if the hot air is generated in the line accommodating space 41, collecting of the hot air in the line accommodating space 41 can be suppressed by emitting this hot air A into the outside air through the opening part 36.

It is to be noted that a cooling water line 42 through which a part of an engine cooling water flows is arranged in the tubular heat insulating material 29 covering the injection-valve side horizontal line 28B3. As a result, in a cold region or the like, for example, the injection-valve side horizontal line 28B3 can be warmed as necessary by using the engine cooling water flowing through the cooling water line 42, freezing of the urea water flowing through the injection-valve side horizontal line 28B3 is constituted to be prevented.

The hydraulic excavator 1 according to this embodiment has the constitution as described above, and its operation will be described below.

When the operator who got onboard the cab 13 starts the engine 7, the hydraulic pump 8 is driven. A pressure oil from the hydraulic pump 8 is supplied to various hydraulic actuators mounted on the hydraulic excavator 1. In this state, when the operator operates the operation lever for traveling, the lower traveling structure 2 can be advanced or retreated. Moreover, when the operator operates the operation lever for work, an excavating work or the like of earth and sand can be performed by using the working mechanism 4, while the upper revolving structure 3 is revolved.

Here, during the operation of the hydraulic excavator 1, the oxidation catalyst 20 provided in the first exhaust gas post-treatment device 18 oxidizes and removes carbon monoxide (CO), hydrocarbon (HC) and the like in the exhaust gas discharged from the engine 7. On the other hand, the urea selective reduction catalyst 24 provided in the second exhaust gas post-treatment device 22 decomposes nitrogen oxides (NOx) in the exhaust gas into harmless nitrogen gas and water by injection of the urea water from the urea water injection valve 26. Moreover, the oxidation catalyst 25 provided in the second exhaust gas post-treatment device 22 oxidizes and removes the residue ammonia. As described above, the exhaust gas from the engine 7 is purified by the exhaust gas purifying device 16. The purified exhaust gas is discharged into the atmospheric air through the tail pipe 14F of the purifying device cover 14E.

Here, in this embodiment, the urea water tank 27 storing the urea water is arranged in the heat exchanger upstream room 15A closer to the upstream side than the heat exchanger 10 in the flow direction of the cooling air. As a result, the urea water tank 27 is not exposed to the heat from the engine 7 or the like and the cooling air warmed by passing through the heat exchanger 10. Therefore, the temperature rise of the urea water stored in the urea water tank 27 can be suppressed, and properties of the urea water can be kept proper.

On the other hand, the injection-valve side horizontal line 28B3 constituting the injection-valve side supply line 28B in the urea water supply line 28 connecting the urea water tank 27 and the urea water injection valve 26 to each other is arranged in the upper-side region of the engine room 15B in a state extending in the left-and-right direction along the upper end of the counterweight 6. As a result, the upper-side region of the engine room 15B which is usually a dead space can be effectively utilized.

In this case, the heat from the engine 7 or the like collects in the upper-side region of the engine room 15B. Therefore, the injection-valve side horizontal line 28B3 arranged in the upper-side region of the engine room 15B is susceptible to the influence of the heat from the engine 7 or the like. On the other hand, in this embodiment, the heat shield cover 38 is mounted on the existing horizontal support member 34 provided in the upper-side region of the engine room 15B in the support member 32 supporting the exterior cover 14. As a result, the line accommodating space 41 is formed between the horizontal support member 34 and the heat shield cover 38, and the injection-valve side horizontal line 28B3 can be accommodated in this line accommodating space 41.

As a result, the injection-valve side horizontal line 28B3 susceptible to the influence of the heat from the engine 7 or the like in the urea water supply line 28 connected to the urea water injection valve 26 through the engine room 15B of the machine room 15 can be shielded from the hot air B by the horizontal support member 34 and the heat shield cover 38. As a result, heating of the urea water in the urea water tank 27 by the heat from the engine 7 or the like until it is supplied to the urea water injection valve 26 through the urea water supply line 28 can be suppressed. Therefore, since deterioration of the urea water by heat can be prevented, reliability of the exhaust gas purifying device 16 including the urea selective reduction catalyst 24 can be improved.

Moreover, since the opening part 36 is provided in the horizontal support member 34, the line accommodating space 41 is open to the outside air at all times through the opening part 36. Therefore, such a situation can be suppressed that the line accommodating space 41 becomes a closed sectional space and the hot air collects inside, and even if a hot air A is generated in the line accommodating space 41, this hot air A is emitted to the outside air through the opening part 36. As a result, the hot air does not collect in the line accommodating space 41, and the temperature rise of the urea water flowing through the injection-valve side horizontal line 28B3 can be reliably suppressed. In this case, the opening part 36 of the horizontal support member 34 is open to a portion faced with the front surface 6B of the counterweight 6. As a result, entry of rainwater, earth and sand or the like into the line accommodating space 41 through the opening part 36 can be suppressed.

Moreover, the injection-valve side horizontal line 28B3 accommodated in the line accommodating space 41 is covered by the tubular heat insulating material 29. As a result, the injection-valve side horizontal line 28B3 can be further shielded from the heat of the engine 7, and the temperature rise of the urea water can be efficiently suppressed.

It is to be noted that, in the embodiment, the case where only the oxidation catalyst 20 is provided in the cylindrical case 19 of the first exhaust gas post-treatment device 18 is exemplified. However, the present invention is not limited to that and may be so constituted that a Diesel Particulate Filter (abbreviated as DPF in some cases) is provided at a location on the downstream side of the oxidation catalyst 20 in the cylindrical case 19 of the first exhaust gas post-treatment device 18, for example.

Moreover, in the embodiment, the hydraulic excavator 1 including the crawler-type lower traveling structure 2 is described as an example of the construction machine. However, the present invention is not limited to that and may be applied to the hydraulic excavator including a wheel-type lower traveling structure, for example, and can be widely applied to other construction machines such as a hydraulic crane and the like.

DESCRIPTION OF REFERENCE NUMERALS

1: Hydraulic excavator (Construction machine)
2: Lower traveling structure
3: Upper revolving structure
5: Revolving frame
6: Counterweight
7: Engine
9: Cooling fan
10: Heat exchanger
14: Exterior cover
14A: Left surface plate
14B: Right surface plate
14C: Top surface plate
15: Machine room
15A: Heat exchanger upstream room
15B: Engine room
16: Exhaust gas purifying device
24: Urea selective reduction catalyst
26: Urea water injection valve
27: Urea water tank
28: Urea water supply line
29: Tubular heat insulating material
32: Support member
33: Vertical support member
34: Horizontal support member
36: Opening part
38: Heat shield cover
41: Line accommodating space

The invention claimed is:
1. A construction machine comprising:
a self-propelled lower traveling structure and an upper revolving structure mounted rotatably on said lower traveling structure,
said upper revolving structure comprising:
a revolving frame forming a support structural body;
a counterweight provided on a rear side of said revolving frame;
an engine located on a front side of said counterweight and provided on said revolving frame in a horizontal position, extending in a left-and-right direction;
a cooling fan provided on one side in a left-and-right direction of said engine and suctioning an outside air as a cooling air by rotating with said engine as a power source;
a heat exchanger located closer to an upstream side in a flow direction of the cooling air than said cooling fan and provided by facing said cooling fan and cooling a fluid by the cooling air;
an exterior cover formed by including a left surface plate, a right surface plate, and a top surface plate and forming a machine room for accommodating onboard devices including said engine and said heat exchanger on said revolving frame;
an exhaust gas purifying device provided in an exhaust pipe of said engine and including a urea selective reduction catalyst for removing nitrogen oxides in an exhaust gas;
a urea water injection valve provided in said exhaust gas purifying device and injecting a urea water which is a reducing agent to an upstream side of said urea selective reduction catalyst;
a urea water tank storing the urea water to be supplied to said urea water injection valve; and
a urea water supply line connecting said urea water tank and said urea water injection valve through said machine room and through which the urea water to be supplied to said urea water injection valve flows, characterized in that:
said construction machine further comprising:
a support member arranged on a front side of said counterweight and supporting said exterior cover;
a heat shield cover provided on said support member for shielding heat from said engine and forming a line accommodating space for accommodating the urea water supply line between itself and said support member, said support member is constituted by including a plurality of vertical support members extending in an up-and-down direction from said revolving frame and a horizontal support member extending in a left-and-right direction;

said horizontal support member is mounted on an upper-part position of said vertical support member and an upper-part position of said heat exchanger, respectively; and said heat shield cover is mounted on said horizontal support member.

2. The construction machine according to claim 1, wherein an opening part for opening said line accommodating space to an outside air is provided on said support member, and said opening part is provided at a portion faced with said counterweight.

3. The construction machine according to claim 1, wherein said urea water supply line accommodated in said line accommodating space is covered by a heat insulating material.

4. The construction machine according to claim 1, wherein said machine room has a heat exchanger upstream room located closer to an upstream side of a flow direction of the cooling air than said heat exchanger and an engine room located closer to a downstream side of the flow direction of the cooling air than said heat exchanger and said engine is arranged;

said urea water tank is arranged in said heat exchanger upstream room;

said urea water supply line is connected to said urea water injection valve from said heat exchanger upstream room through said engine room; and said line accommodating space formed between said support member and said heat shield cover accommodates a portion in said urea water supply line arranged in said engine room.

* * * * *